US008737842B2

(12) United States Patent
Schenk et al.

(10) Patent No.: US 8,737,842 B2
(45) Date of Patent: May 27, 2014

(54) METHOD AND SYSTEM FOR ASYNCHRONOUS LAMP IDENTIFICATION (75) Inventors: Tim Corneel Wilhelmus Schenk, Eindhoven (NL); Lorenzo Feri, Eindhoven (NL); Johan Cornelis Talstra, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 320 days.

(21) Appl. No.: 13/381,982

(22) PCT Filed: Jun. 30, 2010

(86) PCT No.: PCT/IB2010/052998
§ 371 (c)(1),
(2), (4) Date: Mar. 16, 2012

(87) PCT Pub. No.: WO2011/001392
PCT Pub. Date: Jan. 6, 2011

(65) Prior Publication Data
US 2012/0170939 A1    Jul. 5, 2012

(30) Foreign Application Priority Data
Jul. 3, 2009 (EP) .................................... 09164498

(51) Int. Cl.
*H04B 10/00* (2013.01)
(52) U.S. Cl.
USPC ........................... 398/172; 398/107; 398/109
(58) Field of Classification Search
USPC ......................................... 398/106–109, 172
See application file for complete search history.

(56) References Cited

U.S. PATENT DOCUMENTS

| 4,779,266 | A  | * | 10/1988 | Chung et al. ................. 370/441 |
| 5,424,859 | A  | * | 6/1995  | Uehara et al. ................ 398/127 |
| 5,635,915 | A  | * | 6/1997  | Gray .............................. 340/9.1 |
| 5,657,145 | A  | * | 8/1997  | Smith .......................... 398/172 |
| 5,838,116 | A  | * | 11/1998 | Katyl et al. .................. 315/307 |
| 5,903,373 | A  | * | 5/1999  | Welch et al. ................. 398/128 |
| 6,198,230 | B1 | * | 3/2001  | Leeb et al. ................... 315/224 |
| 6,400,482 | B1 | * | 6/2002  | Lupton et al. ............... 398/140 |
| 6,426,599 | B1 | * | 7/2002  | Leeb ............................ 315/224 |
| 6,504,633 | B1 | * | 1/2003  | Hovorka et al. ............. 398/183 |
| 6,519,275 | B2 | * | 2/2003  | Callaway et al. ............ 375/140 |
| 6,542,270 | B2 | * | 4/2003  | Perkins et al. ............... 398/140 |
| 6,560,471 | B1 | * | 5/2003  | Heller et al. ................. 600/347 |

(Continued)

FOREIGN PATENT DOCUMENTS

| WO | 2006111930 A2 | 10/2006 |
| WO | 2007125477 A2 | 11/2007 |

(Continued)

*Primary Examiner* — Agustin Bello (57) ABSTRACT

The invention relates to embedding data into a luminance output generated by an illumination system comprising a light source and a controller. The controller is configured to embed data by modulating a drive signal applied to the light source with an information signal comprising a shifted base code and a synchronization code. The synchronization code serves to provide synchronization for the receiver, while the shifted base code serves to carry the embedded data. A cyclic phase shift that is applied to a base code to generate the shifted base code corresponds to particular data, such as, for example, light source identification, that needs to be embedded into the luminance output of the illumination system. In this manner, data may be embedded into the luminance output generated by a light source without requiring synchronization of this light source with other light sources.

15 Claims, 7 Drawing Sheets

(56) References Cited

U.S. PATENT DOCUMENTS

| | | | |
|---|---|---|---|
| 6,574,268 B1* | 6/2003 | Bergamo | 375/142 |
| 6,794,831 B2* | 9/2004 | Leeb et al. | 315/307 |
| 6,865,347 B2* | 3/2005 | Perkins et al. | 398/172 |
| 6,954,591 B2* | 10/2005 | Lupton et al. | 398/115 |
| 7,120,205 B2* | 10/2006 | Salehi et al. | 375/316 |
| 7,352,972 B2* | 4/2008 | Franklin | 398/172 |
| 7,689,130 B2* | 3/2010 | Ashdown | 398/172 |
| 7,778,548 B2* | 8/2010 | Yamamoto | 398/78 |
| 7,884,732 B2* | 2/2011 | Huizenga | 340/635 |
| 7,952,292 B2* | 5/2011 | Vegter et al. | 315/153 |
| 8,005,366 B2* | 8/2011 | Shin et al. | 398/129 |
| 8,045,599 B2* | 10/2011 | Darwood et al. | 375/147 |
| 8,165,472 B2* | 4/2012 | Takene et al. | 398/172 |
| 8,188,878 B2* | 5/2012 | Pederson et al. | 340/815.45 |
| 8,260,137 B2* | 9/2012 | Linnartz | 398/77 |
| 8,488,971 B2* | 7/2013 | Linnartz et al. | 398/118 |
| 8,494,367 B2* | 7/2013 | Linnartz | 398/78 |
| 8,600,656 B2* | 12/2013 | Mimeault et al. | 701/301 |
| 2002/0043938 A1* | 4/2002 | Lys | 315/149 |
| 2002/0145776 A1* | 10/2002 | Chow et al. | 359/124 |
| 2006/0239689 A1* | 10/2006 | Ashdown | 398/130 |
| 2006/0275040 A1* | 12/2006 | Franklin | 398/172 |
| 2008/0185969 A1* | 8/2008 | Vegter et al. | 315/158 |
| 2009/0016735 A1 | 1/2009 | Schmitz et al. | |
| 2009/0189530 A1* | 7/2009 | Ashdown et al. | 315/152 |
| 2010/0165954 A1* | 7/2010 | Lin et al. | 370/335 |
| 2010/0271476 A1* | 10/2010 | Damink et al. | 348/135 |
| 2012/0170939 A1* | 7/2012 | Schenk et al. | 398/106 |

FOREIGN PATENT DOCUMENTS

| | | |
|---|---|---|
| WO | 2009010909 A1 | 1/2009 |
| WO | 2009010916 A2 | 1/2009 |
| WO | 2009010926 A2 | 1/2009 |
| WO | 2009136309 A2 | 11/2009 |

* cited by examiner

METHOD AND SYSTEM FOR ASYNCHRONOUS LAMP IDENTIFICATION

FIELD OF THE INVENTION

Embodiments of the present invention relate generally to the field of illumination systems and optical receivers, and, more specifically, to systems and methods for embedding data into the luminance output of such illumination systems.

DESCRIPTION OF THE RELATED ART

In recent years, highly advanced illumination systems are being developed that allow consumers to obtain a desired ambiance for a particular room or space. These illumination systems move away from the traditional control of individual light sources (switching on/off and dimming) to scene setting, where sets of light sources are controlled simultaneously. An example of such an illumination system is an arrangement of several sets of light sources in a room, a lobby or a vehicle.

For these scene setting applications, intuitive user interaction is identified as one of the most important success factors. Providing a user with information related to the light sources, such as localized identification of the light sources, their capabilities and current settings, is key for enabling an intuitive interaction. One technique that has been proposed to provide the user with such information is based on embedding codes (also referred to as "identifiers") identifying a light source or a group of light sources by modulating the luminance output of the illumination device in a manner so that the embedded codes are invisible to the consumers. The embedded codes are received by an optical receiver which may, for example, be implemented in a remote control for controlling the illumination devices or included in another unit such as a switch or a sensor device.

Previous implementations of this technique were based on embedding the identifiers in the light output intensity of the light sources. However, most of the previous implementations require some kind of synchronization between the different light sources. Such a synchronization requires additional hardware, increasing complexity and cost of the illumination system.

As the foregoing illustrates, what is needed in the art is a technique for embedding data into a luminance output of light sources that may operate asynchronously.

SUMMARY OF THE INVENTION

It is an object of the invention to provide an illumination system, an illumination structure, and a method capable of embedding data in a luminance output of the illumination system. It is also an object to provide an optical receiver capable of receiving and processing the luminance output containing embedded data.

One embodiment of the present invention sets forth an illumination system for embedding data into a luminance output of the illumination system. The system comprises a first controller and a first light source. The first controller is configured for generating a first shifted base code by circularly shifting a base code within a base code period with a first phase shift to embed first data into the first shifted base code. The first controller is also configured for generating a first information signal comprising the first shifted base code and a synchronization code. The first phase shift corresponds to the first data. The first controller is further configured for generating a first modulated drive signal by modulating one or more of first drive patterns of a first drive signal in dependence of the first information signal such that the first data is embedded in the luminance output of the illumination system. The controller may be implemented in hardware, in software, or as a hybrid solution having both hardware and software components. The first light source is configured for generating a first luminance output in dependence of the first modulated drive signal. The luminance output of the illumination system comprises the first luminance output.

Moreover, a method for embedding data into a luminance output of the illumination system is provided. The method comprises the steps of generating a first shifted base code by circularly shifting a base code within a base code period with a first phase shift to embed first data into the first shifted base code, where the first phase shift corresponds to the first data, and generating a first information signal comprising the first shifted base code and a synchronization code. The method also includes the steps of generating a first modulated drive signal by modulating one or more of first drive patterns of a first drive signal in dependence of the first information signal such that the first data is embedded in the luminance output of the illumination system and generating a first luminance output in dependence of the first modulated drive signal, where the luminance output of the illumination system comprises the first luminance output.

In order to enable retrieving the data from the luminance output of the illumination device, an optical receiver is disclosed. The disclosed optical receiver includes an optical detector configured for detecting the first luminance output. The receiver also includes a processing unit having access to the base code and the synchronization code and configured for retrieving the first information signal based on the detected first luminance output and correlating the first information signal with the synchronization code to generate a first correlation output having at least one peak. The receiver is further configured for, based on the location of the at least one peak within the first correlation output, cyclically correlating the first information signal with the base code to generate a second correlation output having one peak. Based on the location of the one peak within the second correlation output, the receiver is configured to determine the first phase shift and, based on the determined first phase shift, determine the first data. Such a receiver may be implemented, for example, in a remote control for controlling the illumination system or included in another unit such as a switch or a sensor device.

As used herein, the term "peak" in a correlation output refers to the peak that is significantly higher than all of the other peaks. While correlation outputs typically include a number of peaks of various heights, including a number of small peaks, differentiating which peak is the one of interest for analyzing the correlation output does not typically present difficulties for the persons skilled in the art. Therefore, only those peaks that are relevant for obtaining the embedded data from the information signal are referred to herein as "peaks" and the smaller, irrelevant peaks are referred to as "subpeaks."

As used herein, the term "drive signal" refers to an electrical signal that, when applied to a light source, causes the light source to generate luminance output. As also used herein, the term "information signal" refers to an electrical signal that is used to modulate the drive signal. The information signal comprises two different sequences of binary values, referred to herein as a "synchronization code" and a "base code." Each of the base code and the synchronization code comprises two or more binary values. As described in greater detail below, the base code serves to embed data into the luminance output of the illumination system, while the synchronization code serves to provide synchronization for the optical receiver configured to retrieve the data embedded in the luminance output.

The time duration of the base code (or, alternatively, the length of the base code measured in the number of binary values comprising the code) is referred to herein as a "base code period." According to one embodiment of the invention, data may be embedded into the information signal by cyclically phase shifting the base code within the base code period. As used herein, the term "phase shift" refers to the time difference between the shifted base code and the base code within a base code period (or, alternatively, to the number of binary values by which the shifted base code is shifted with respect to the base code).

In one embodiment, the first data may be embedded into the first shifted base code using binary modulation where the first data is determined by a direction of phase shifting of the base code. In another embodiment, the first data may be embedded into the first shifted base code using multilevel modulation where the first data is determined by a direction and an amount of phase shifting of the base code. Similarly, the first modulated drive signal may be modulated via binary modulation or multilevel modulation using pulse width modulation, pulse density modulation, or amplitude modulation.

Preferably, data is embedded in the luminance output in such a manner that a human eye cannot distinguish between a luminance output that includes the embedded data and a luminance output that does not.

In one embodiment, the first shifted base code within the first information code may be immediately preceded by or immediately followed by the synchronization code. In another embodiment, the information signal may comprise one synchronization code immediately preceded or immediately followed by two or more of the first shifted base codes. In yet another embodiment, there may be a sequence of one or more binary values between the synchronization code and the first shifted base code (such a sequence is referred herein as a "spacer sequence"). For example, there may be a spacer sequence of zeros between the synchronization code and the first shifted base code. Inserting such a spacer sequence may decrease, simplify, and/or improve the accuracy of data processing necessary for retrieving the first data at the receiver. In yet another embodiment, the first information signal may comprise an alternating sequence of one or more of the first shifted base codes and the synchronization codes.

The illumination system may further comprise means for providing the synchronization code, the base code, information related to a frequency of the occurrence of the synchronization code in the information signal, or derivatives thereof, to the receiver.

The gist of the present invention resides in embedding data into a luminance output generated by a light source by modulating a drive signal applied to the light source with an information signal comprising a shifted base code and a synchronization code. The synchronization code serves to provide synchronization for the receiver, while the shifted base code serves to carry the embedded data. A cyclic phase shift that is applied to a base code to generate the shifted base code corresponds to particular data that needs to be embedded into the luminance output of the illumination system. For example, according to one embodiment of the invention, the data may comprise an identification of the light source. In such an embodiment, one light source may be identified by being associated with a phase shift of e.g. one unit, where the base code may be cyclically shifted to the right or to the left by one binary value, another light source may be identified by being associated with a phase shift of three units, where the base code is cyclically shifted by three binary values, and yet another light source may be identified by a phase shift of zero units, where no phase shift is applied to the base code, and so on. In this manner, data may be embedded into the luminance output generated by a light source without requiring synchronization of this light source with other light sources. The receiver can extract the embedded data by, first, deriving the synchronization based on the synchronization codes present in the information signal and, second, applying a cyclic correlation with the base code to recover the phase shift applied to the base code. The recovered phase shift corresponds to the data that is embedded into the luminance output of the light source.

The light sources described herein may comprise high/low pressure gas discharge sources, inorganic/organic light emitting diodes, laser diodes, incandescent sources, or halogen sources. Data embedded in the luminance output of the illumination system may comprise localized identification of the light sources, their capabilities and current settings, or other types of information related to the light sources. However, it should be noted that the disclosed illumination system is not necessarily applied for the purpose of illuminating a space or area but may also be applied for data communication as such. As an example, the illumination system may constitute an access point to a network. For such applications, at least part of the luminance output produced by the illumination system may lie outside of the visible spectrum (i.e., the light output of one of the light sources of the system may lie outside of the visible spectrum).

The embodiment of claim 2 sets forth that data embedded into the luminance output of the illumination system may advantageously comprise an identification of the light source. The number of light sources that may be identified in the manner described above is determined by the length of the base code. When the base code comprises N binary values, at least N different light sources may be identified.

The embodiment of claim 3 advantageously allows embedding more data. For example, when the data comprises identification of the light source and the base code comprises N binary values, embodiment of claim 3 allows identifying 2N different light sources.

The embodiment of claim 4 specifies advantageous types of synchronization codes and base codes that may be used by the first controller so that the optical receiver can accurately determine the embedded first data. For example, the synchronization code may comprise a Barker sequence having good autocorrelation properties and the base code may comprise a maximum length sequence, a Gold code, or a Kasami sequence having good cyclic autocorrelation properties. In one embodiment, the base code may be generated using linear feedback shift registers.

The embodiment of claim 5 allows additional data to be embedded into the luminance output by embedding this data into the signs of the different shifted base codes within the information signal. The additional data may comprise e.g. data related to the temperature or the dimming levels of the first light source. In one embodiment, the first information signal may comprise a second shifted base code immediately preceding or immediately following the first shifted base code. In such an embodiment, data throughput may be advantageously maximized by decreasing the frequency of occurrence of the synchronization code.

The embodiment of claim 6 advantageously allows embedding data into a luminance output generated by two different light sources. The two different light sources may either operate synchronously (i.e., the synchronization code of the information signal corresponding to one light source begins at the same time as the synchronization code of the information signal corresponding to the other light source) or asynchronously (i.e., the synchronization code of the information signal corresponding to one light source begins at a different time than the synchronization code of the information signal corresponding to the other light source). For either synchronous or asynchronous mode of operation, the same synchronization codes and the same base codes may be used for the first and second light sources, where a corresponding controller applies a unique cyclic shift to the base code for each of the light sources to embed different data into the luminance outputs of the light sources.

Even though claim 6 recites a second controller, persons skilled in the art will recognize that the second controller may be completely or partially combined with the first controller (i.e., a single system controller may control the operation of the first and second light sources). In the further discussions, the first and second controllers will be referred to simply as a single "system controller."

The embodiment of claim 8 advantageously provides an optical receiver for use with the illumination system having multiple synchronous light sources while embodiments of claims 9 and 10 advantageously provide optical receivers for use with the illumination system having multiple asynchronous light sources.

The embodiments of claims 14 and 15 provide computer programs comprising software code portion for implementing the functionality recited in claims 8 and 9, respectively. Such computer programs may, for example, be downloaded to the existing optical receivers or be stored upon manufacturing of the optical receivers.

The embodiment of claim 11 advantageously allows determining additional data embedded in the luminance output of the illumination system.

Finally, claim 12 proposes an illumination structure comprising one or more illumination systems and a remote control accommodating an optical receiver.

Hereinafter, an embodiment of the invention will be described in further detail. It should be appreciated, however, that this embodiment may not be construed as limiting the scope of protection for the present invention.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
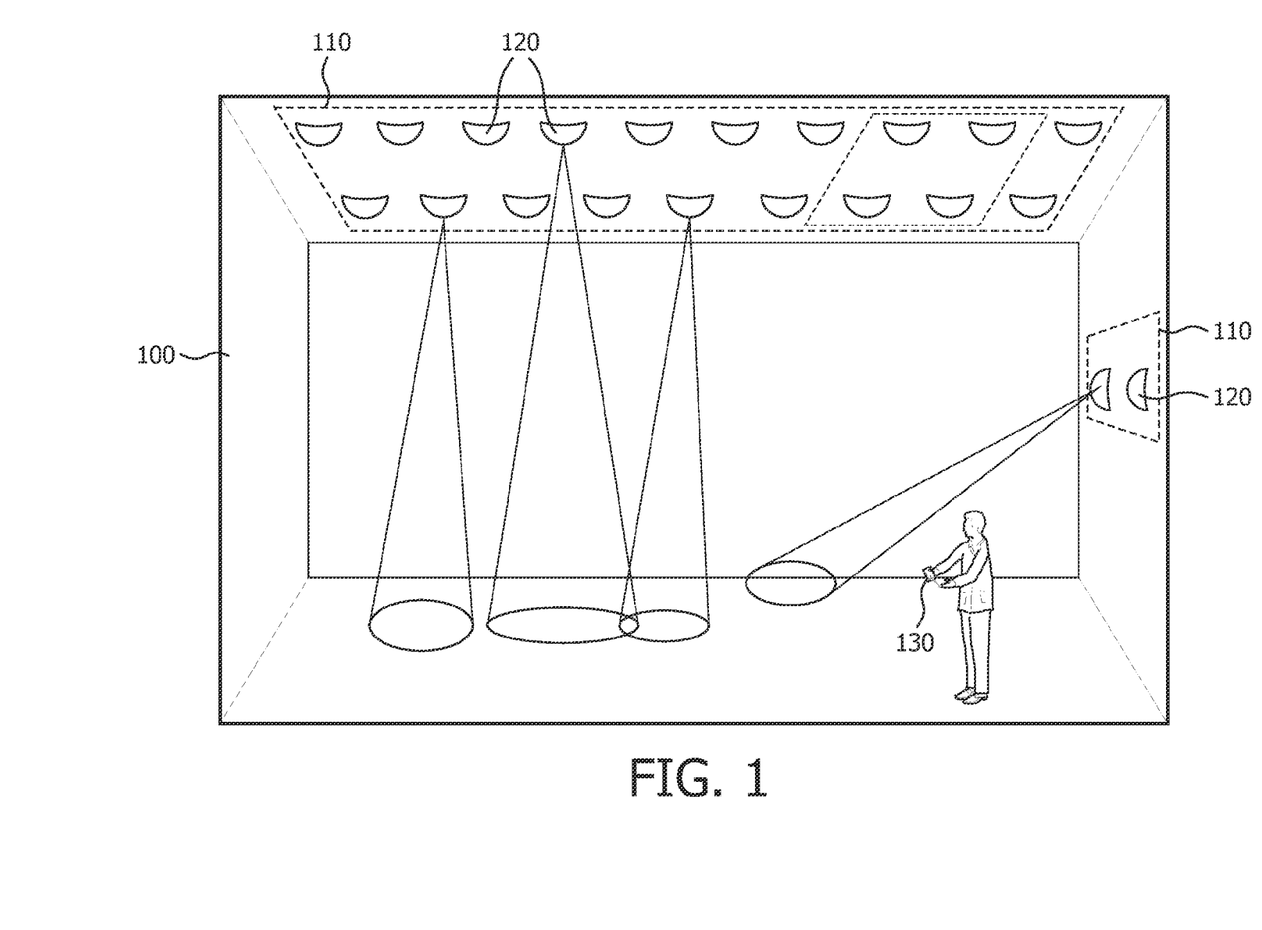
FIG. 1 is a schematic illustration of an illumination system installed in a structure according to one embodiment of the present invention.

FIG. 1 shows a structure 100—in this case a room—with an installed illumination system 110. The illumination system 110 comprises one or more of light sources 120 and one or more controllers (not shown in FIG. 1) controlling the light sources 120. The light sources 120 may comprise high/low pressure gas discharge sources, inorganic/organic light emitting diodes, laser diodes, incandescent sources, or halogen sources. The illumination system 110 may further comprise a remote control 130 allowing a user to control the light sources 120.

Figure 2:
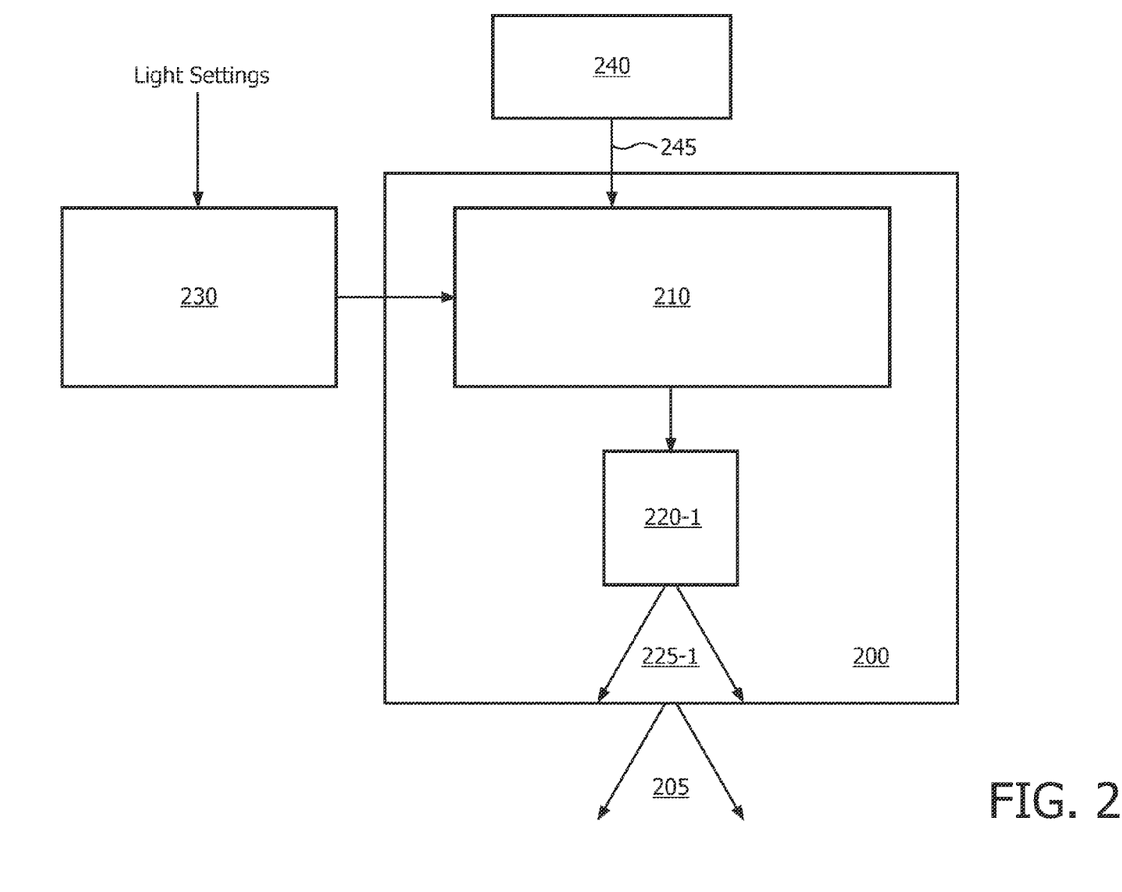
FIG. 2 is a schematic illustration of an illumination system according to one embodiment of the present invention.

FIG. 2 is a schematic illustration of an illumination system 200 according to one embodiment of the present invention. The illumination system 200 may be used as the illumination system 110 in the structure 100 illustrated in FIG. 1. As shown, the illumination system 200 includes at least a system controller 210 and a light source 220-1, and is configured to generate a luminance output 205 according to light settings.

In other embodiments, the illumination system may include additional light sources and additional controllers controlling the additional light sources. Such embodiments will be described herein with a reference to a single controller (the system controller 210) controlling the various light sources. However, people skilled in the art will recognize that the system controller 210 may comprise individual controllers for each of the light sources included in the illumination system 200.

The illumination system 200 is configured to operate as follows. As shown in FIG. 2, the light settings for the illumination system 200 are provided to a drive signal generator 230 (which, optionally, may be included within the illumination system 200). The light settings indicate what the average luminance output 205 should be in terms, for example, of light power, e.g. defined in lumen, and color. The light settings may be provided by a user via the remote control 130 or may be preprogrammed and provided from an external unit controlling the scene setting. Alternatively, the light settings may be preprogrammed and stored in a memory within the drive signal generator 230 or within the illumination system 200. The drive signal generator 230 translates the light settings into different electrical drive signals for different light sources within the illumination system 200 and provides the drive signals to the system controller 210. In the embodiment illustrated in FIG. 2, the drive signal generator 230 translates the light settings into a first drive signal for the first light source 220-1. The system controller 210, in turn, drives the different light sources with their respective drive signals to produce the luminance output 205. In the embodiment illustrated in FIG. 2, the system controller 210 is configured to drive the light source 220-1 with a first drive signal to produce a luminance output 225-1. The luminance output 205 of the illumination system 200 comprises the luminance output 225-1.

As previously described, the light settings indicate what the luminance output 205 of the illumination system 200 should be in terms, for example, of light color. The color change of the luminance output 205 may be achieved by differently dimming the different light sources (additional, optional, light sources not shown in FIG. 2) within the illumination system 200 via controlling the drive signals provided to the system controller 210 from the drive signal generator 230. For a constant dimming level per light source, the drive signal that is provided from the drive signal generator 230 to the system controller 210 comprises a repeated pattern of pulses (referred to herein as "drive pattern"), repeating with a certain frame period.

Various methods for dimming the light sources are known to people skilled in the art and, therefore, are not described here in detail. These methods include e.g. pulse width modulation, pulse density modulation, or amplitude modulation.

The system controller 210 is further configured to receive a data signal 245 from a data source 240. The data signal 245 comprises data, and the system controller 210 is configured to embed the data into the luminance output 205 of the illumination system 200. The data may represent, for example, a localized identification of the illumination system 200, the light source 220-1, their capabilities and current light settings, or other type of information that may be related to the illumination system 200. As described below, the system controller 210 embeds the data by modulating a drive signal applied to the light source 220-1 with an information signal comprising a shifted base code and a synchronization code. A cyclic phase shift that is applied to a base code to generate the shifted base code corresponds to the particular data to be embedded in the luminance output 205.

Figure 3:
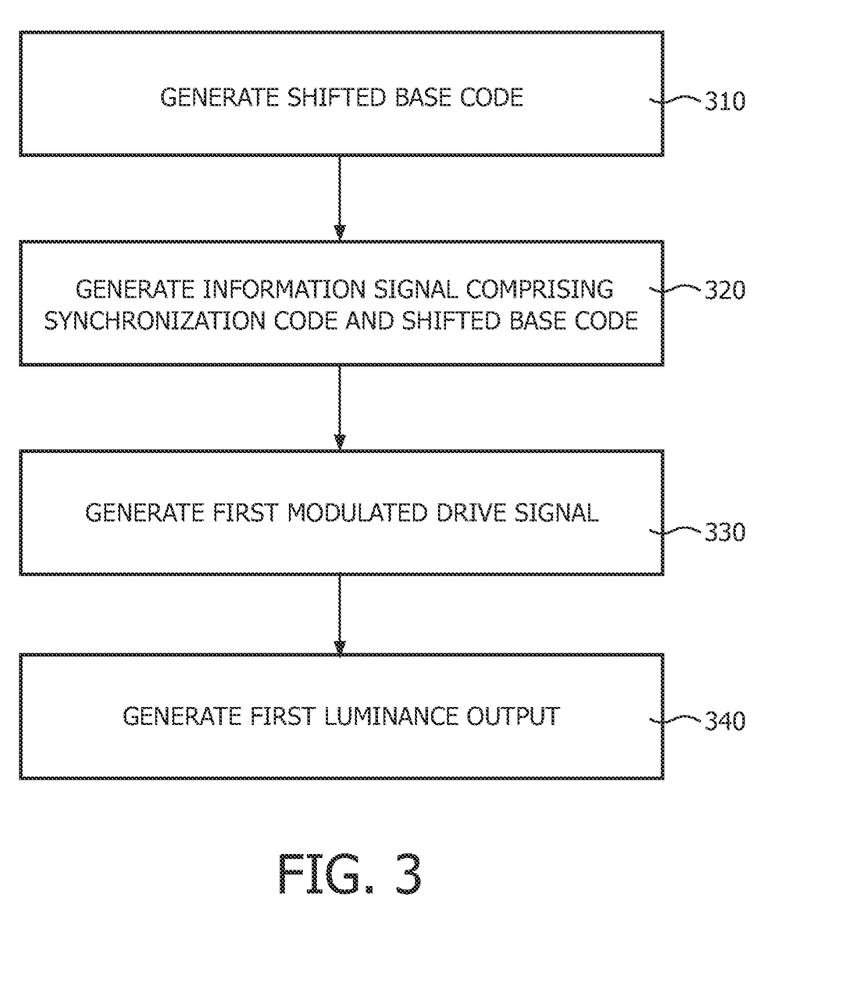
FIG. 3 is a flow diagram of method steps for embedding data into a luminance output of an illumination system, according to one embodiment of the present invention.

FIG. 3 is a flow diagram of method steps for embedding at least part of data of the data signal 245 into the luminance output 205 of the illumination system 200, according to one embodiment of the present invention. While the method steps are described in conjunction with FIGS. 1 and 2, persons skilled in the art will recognize that any system configured to perform the method steps, in any order, is within the scope of the present invention.

The method begins in step 310, where the system controller 210 generates a shifted base code by circularly shifting a base code within a base code period with a phase shift to embed data into the shifted base code. A base code is a sequence of two or more binary values. As described above, the term "phase shift" refers to the time difference between the shifted base code and the base code within a base code period or, alternatively, to the number of binary values by which the shifted base code is shifted with respect to the base code. The phase shift corresponds to the data embedded into the shifted base code.

Note that there are different ways to embed data in a phase shift. The first and most straightforward method is the use of a binary modulation. For this case, the direction of the phase shift determines the data. For example, a negative shift may represent a logical "0" and a positive shift may represent a logical "1." Alternatively, the modulation could be multilevel, where both the direction and the magnitude of phase shift determine the data. For example a negative shift over one binary value may represent a logical "00", a negative shift over two binary values may represent a logical "01", a positive shift over one binary value may represent a logical "10" and a positive shift over two binary values may represent a logical "11." Thus, one or more data symbols may be embedded within each base code period. Note also that data symbols may be embedded when the phase shift is zero.

According to one embodiment of the invention, the data embedded in the shifted base code may comprise an identification of the light source 220-1. In such an embodiment, the light source 220-1 may be identified by being associated with a phase shift of e.g. one unit, where the base code is cyclically shifted to the right by one binary value.

From step 310, the method proceeds to step 320, where the system controller 210 generates an information signal comprising the shifted base code and a synchronization code. Similarly to the base code, the synchronization code is also a sequence of two or more binary values. While the base code serves to embed data into the luminance output 205 of the illumination system 200, the synchronization code serves to provide synchronization for the optical receiver configured to retrieve the embedded data.

The method then proceeds to step 330, where the system controller 210 generates a modulated drive signal by modulating the drive signal for the light source 220-1. The system controller 210 modulates the drive signal in response to the information signal such that the data embedded in the shifted base code of the information signal may be embedded in the modulated drive signal and then, in turn, embedded in the luminance output 205 of the illumination system 200.

Figure 4:
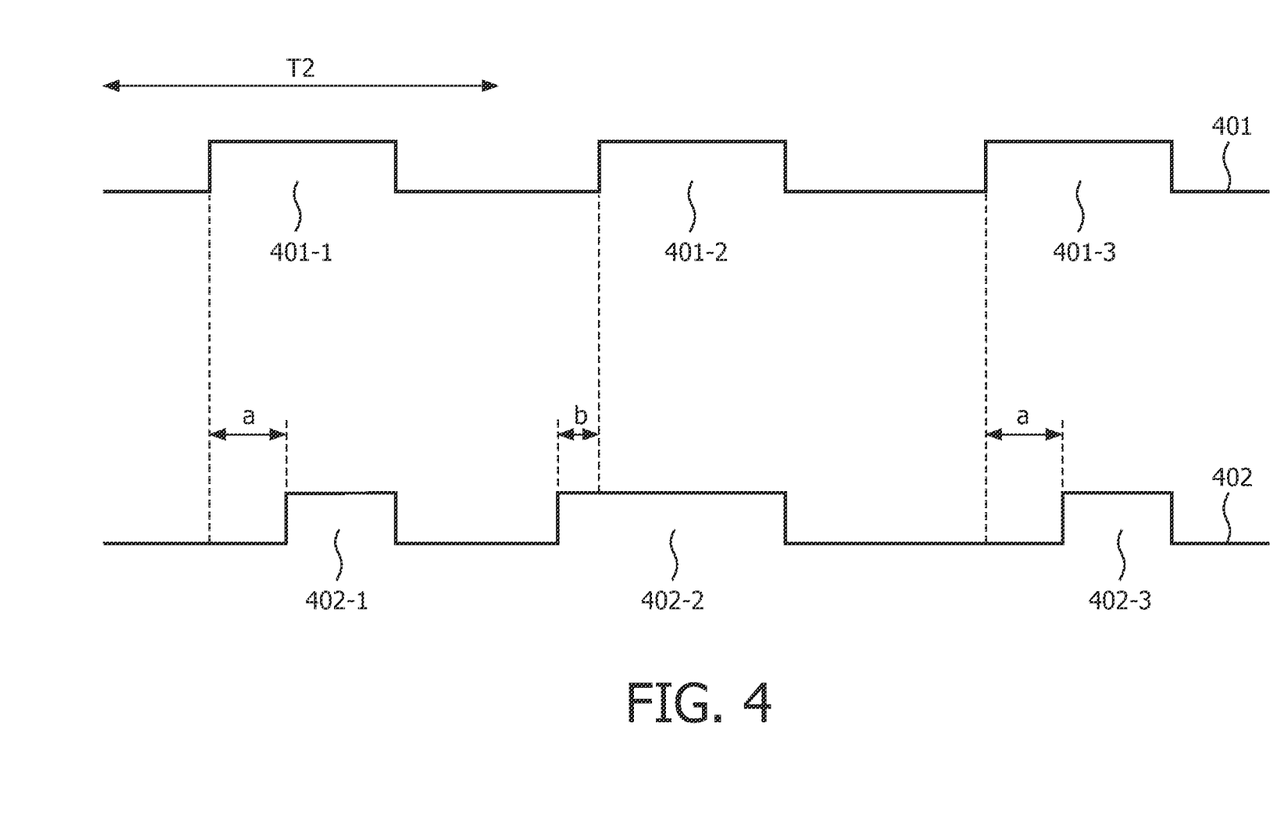
FIG. 4 is a schematic illustration of parts of a drive signal and a modulated drive signal, according to one embodiment of the present invention.

In various embodiments, the system controller 210 may generate the modulated drive signal by modulating the drive signal via binary or multilevel modulation using e.g. pulse width modulation (PWM), pulse position modulation, pulse density modulation, or amplitude modulation. For example, to embed a binary value of 0 from the information signal using PWM, the system controller 210 may make a drive pattern within the drive signal narrower by an amount a to embed a binary value of "0" from the information signal and the system controller 210 may make another drive pattern within the drive signal wider by an amount b to embed a binary value of "1" from the information signal. This is illustrated in FIG. 4. As shown, a drive signal 401 comprises three drive patterns shown as drive patterns 401-1, 401-2, and 401-3. Each of the drive patterns 401-1 through 401-3 repeat with a repetition period T2. The system controller 210 may generate a modulated drive signal 402 to embed "010" into the drive signal 401 by making the drive patterns 401-1 and 401-3 of the signal 401 narrower to create drive patterns 402-1 and 402-3, respectively, of the signal 402 and by making the drive pattern 401-2 of the signal 401 wider to create a drive pattern 402-2 of the signal 402. By making the ratio between the amount a and the amount b equal to the ratio between the number of 1's and 0's in the information code, embedding data in the luminance output of the illumination system may be made invisible for the human eye because the time average of the modulated drive signal remains the same as that of the original drive signal. Persons skilled in the art will recognize other methods for modulating the drive signal in dependence of the information signal to embed data into luminance output of the illumination system.

The method ends in step 340, where the light source 220-1 generates the luminance output 225-1 in response to the modulated drive signal applied by the system controller 210 to the light source 220-1. The luminance output 205 of the illumination system 200 comprises the luminance output 225-1.

Figure 5:
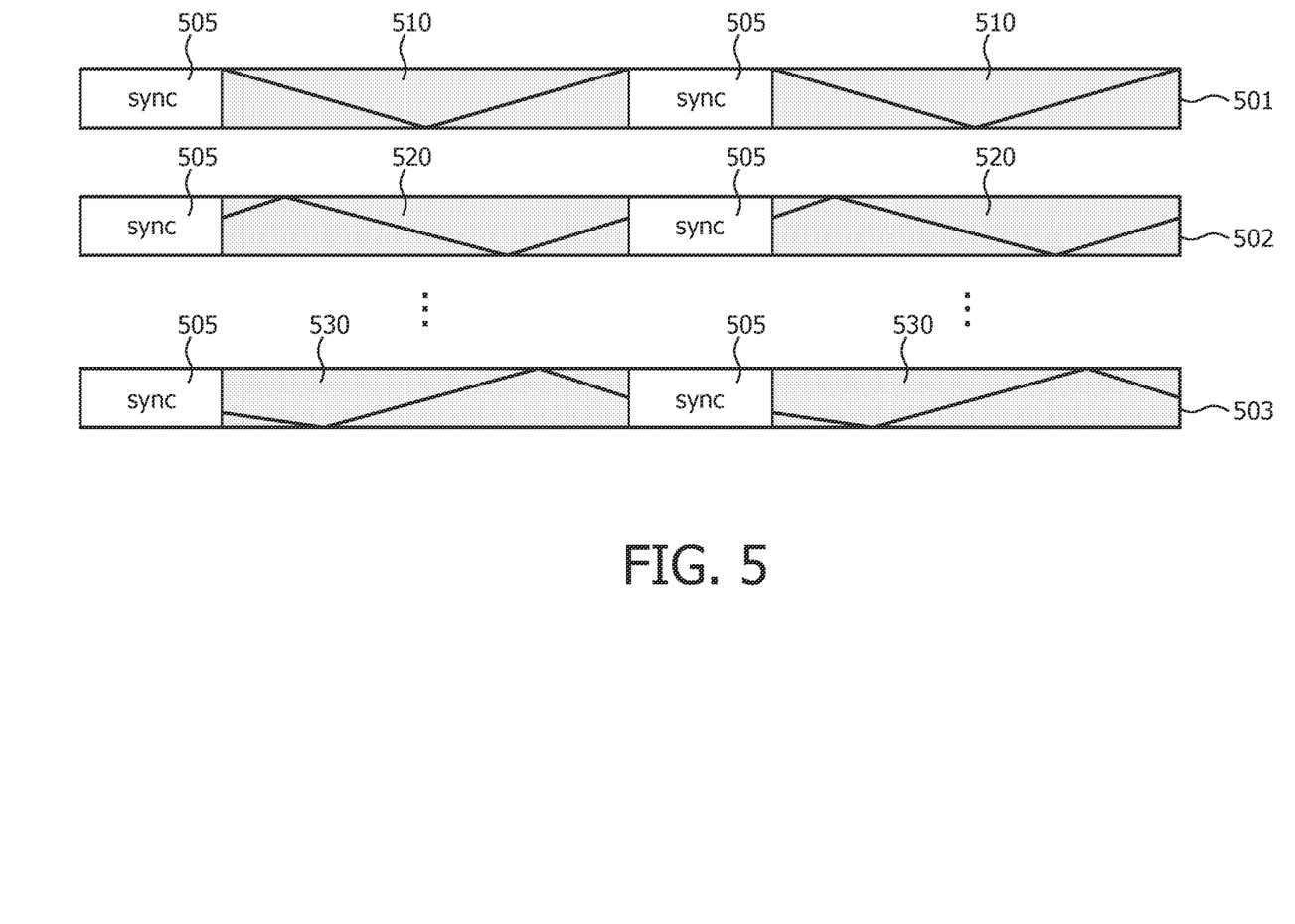
FIG. 5 is a schematic illustration of information signals for different light sources, according to one embodiment of the present invention.

FIG. 5 is a schematic illustration of information signals 501, 502, and 503 for three different light sources, according to one embodiment of the present invention. The information signals 501-503 comprise different data embedded in the different phase shifts of the base codes. As shown, the information signal 501 comprises an alternating sequence of a synchronization code 505 and a shifted base code 510. Similarly, the information signal 502 comprises an alternating sequence of the synchronization code 505 and a shifted base code 520, and the information signal 503 comprises an alternating sequence of the synchronization code 505 and a shifted base code 530. The information signals 501-503 comprise the same synchronization code and the same base code, but, for each of the information signals 501-503, the base code is cyclically shifted with a different phase shift to embed different data into the luminance outputs of the three different light sources.

If the data embedded into luminance output of the illumination system comprises some kind of identifiers, such as e.g. identifiers of the light sources, then the number of different light sources that may be identified in this manner depends on the length of the base code. Thus, for a base code comprising N binary values, N different light sources may be identified by cyclically shifting the base codes with different phase shifts.

In other embodiments data may be embedded by further setting a sign of the shifted base code within the information signal. If the data embedded into the luminance output of the illumination system comprises identifiers of the light sources and a base code comprises N binary values, 2N different light sources may be identified by setting the sign of the base codes and cyclically shifting these base codes with different phase shifts.

Furthermore, when an information signal comprises an alternating sequence of synchronization codes and shifted base codes, additional data may be embedded into the luminance output 205 by setting the signs of the different instances of the shifted base code within the information signal. In this manner, additional data related e.g. to temperature or dimming level of a light source may be embedded in the luminance output of the light source.

While in the embodiment illustrated in FIG. 5 the information signals comprise alternating sequences of the synchronization codes and the shifted base codes, in other embodiments, the information signals may comprise one synchronization code and two or more shifted base codes preceding or following the synchronization code. For example, an information signal may comprise an alternating sequence of a synchronization code and three shifted base codes. Reducing the occurrence of the synchronization codes in the information signal allows embedding more data. On the other hand, increasing the occurrence of the synchronization codes allows achieving easier and more accurate data retrieval at the receiver side since the receiver can average information obtained from the repeated shifted base codes. In yet another embodiment, an information signal may also include a sequence of one or more binary values between the synchronization code and the shifted base code, referred herein as a "spacer sequence." For example, an information signal may include a spacer sequence of fifteen zeros between the synchronization code and the shifted base code. Inserting such a spacer sequence may decrease and/or simplify data processing necessary for retrieving the embedded data at the receiver side and enable more accurate identification or illumination contribution estimation at the receiver. The illumination contribution estimation is described in greater detail in FIG. 7.

Figure 6A:
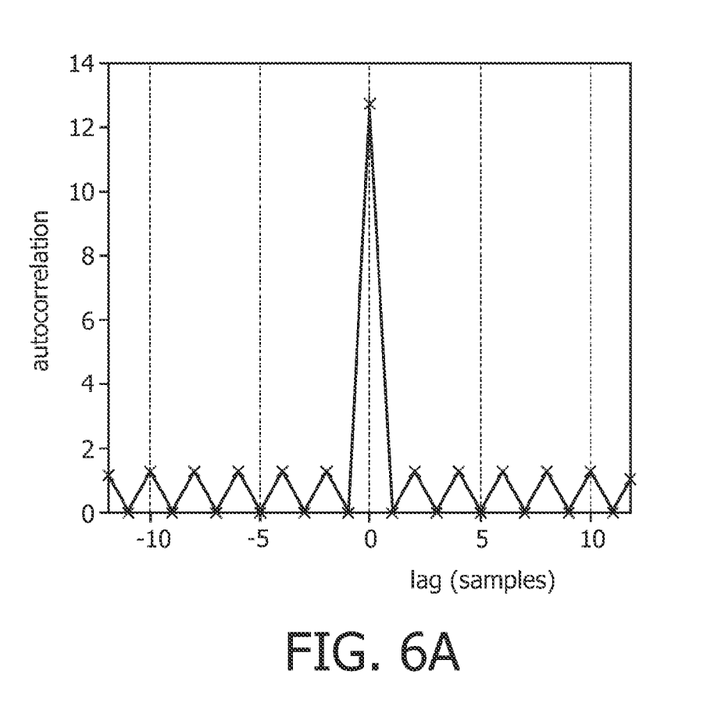
FIG. 6A illustrates autocorrelation results of a Barker sequence of length 13, according to one embodiment of the present invention.

In a preferred embodiment, the synchronization code comprises a code that has good autocorrelation properties, which means that, when the information signal is correlated with the synchronization code, the correlation value will only be relatively high for non-shifted versions of the code and will be significantly lower for the shifted versions. An example of such a code is Barker's sequence, which exists for lengths of 2, 3, 4, 5, 7, 11, and 13. The Barker's sequence of length 13 comprises 1 1 1 1 1 0 0 1 1 0 1 0 1. An autocorrelation result of such a sequence is illustrated in FIG. 6A.

Figure 6B:
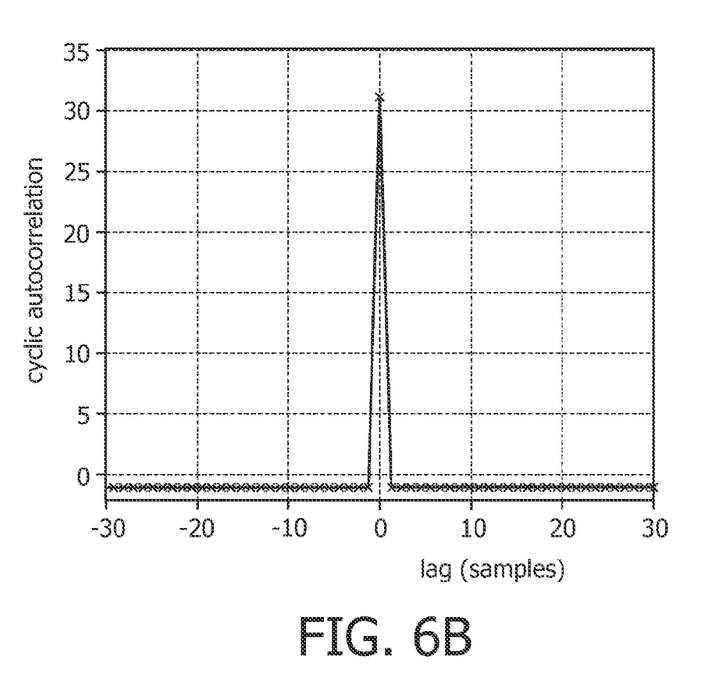
FIG. 6B illustrates cyclic autocorrelation results of an m-sequence of length 31, according to one embodiment of the present invention.

Also in a preferred embodiment, the base code comprises a code that has good cyclic correlation properties, which means that, when, based on the correlation output of the information signal correlated with the synchronization code, the information signal is correlated with the base code, the correlation value will only be relatively high for a non-(cyclically) shifted versions of the code, while for all other cyclic shifts the correlation values are significantly smaller. Examples of such a code include a maximum length sequence (also referred to as an "m-sequence"), a Gold code, or a Kasami sequence. The m-sequence of length 31 comprises 0 0 0 0 1 0 1 0 1 1 1 0 1 1 0 0 0 1 1 1 1 1 0 0 1 1 0 1 0 0 1. A cyclic autocorrelation result of such a sequence is illustrated in FIG. 6B. The m-sequence may be generated using linear feedback shift registers which may be included within the system controller 210 (registers not shown in FIG. 2).

Furthermore, the synchronization code and the base code should be chosen such that the cross correlation between the synchronization code and the base code is low. In this case, the synchronization code, the base code, and the phase shift applied to the base code may be accurately detected at the receiver side.

Returning back to FIG. 2, the illumination system 200 may further optionally comprise at least a second light source and a second controller (not shown in FIG. 2). All of the discussions above also hold for the second light source and the second controller. Assuming that, in one embodiment, the functionality of the second controller would be performed by the system controller 210, then, when operating with two different light sources, the system controller 210 would be configured to perform the following steps.

As described above, the system controller 210 generates a first shifted base code by circularly shifting a base code within a base code period with a first phase shift to embed first data into the first shifted base code, where the first phase shift corresponds to the first data. The system controller 210 also generates a first information signal comprising the first shifted base code and a synchronization code, and generates a first modulated drive signal by modulating one or more of first drive patterns of a first drive signal in dependence of the first information signal such that the first data is embedded in the luminance output of the illumination system. In addition, the system controller 210 similarly generates a second shifted base code by circularly shifting the base code within the base code period with a second phase shift to embed second data into the second shifted base code, where the second phase shift corresponds to the second data. The system controller 210 further generates a second information signal comprising the second shifted base code and the synchronization code, and generates a second modulated drive signal by modulating one or more of second drive patterns of a second drive signal in dependence of the second information signal such that the second data is embedded in the luminance output of the illumination system. In response to the first modulated drive signal, the first light source generates a first luminance output and, in response to the second modulated drive signal, the second light source generates a second luminance output. In such an embodiment, the luminance output 205 comprises the first luminance output and the second luminance output.

The two light sources within the illumination system 200 may operate either in a synchronous mode or in an asynchronous mode. In the synchronous mode, the synchronization codes of the information signals used with the two light sources completely overlap in time (i.e., the synchronization codes of the first information signal begin at the same time as the synchronization codes of the second information signal). In the asynchronous mode, the synchronization codes of the two light sources do not overlap in time (i.e., the synchronization codes of the first information signal begin at different times than the synchronization codes of the second information signal). For either synchronous or asynchronous mode of operation, the same synchronization codes and the same base codes may be used for all of the light sources, where the system controller 210 applies a unique cyclic shift to the base code for each of the light sources. Thus, data may be embedded into the luminance output generated by each of the light sources without requiring synchronization with the other light sources.

Figure 7:
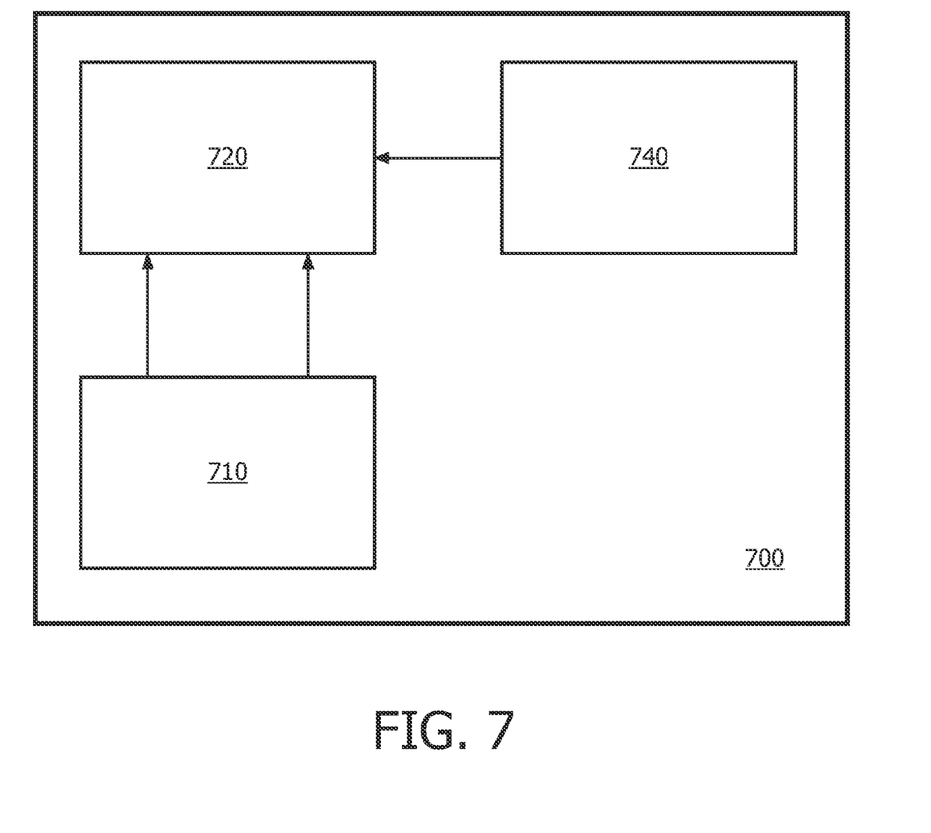
FIG. 7 is a schematic illustration of an optical receiver, according to one embodiment of the present invention.

FIG. 7 is a schematic illustration of an optical receiver 700, according to one embodiment of the present invention, configured for use with the illumination system 200. The optical receiver 700, which may be included within the remote control 130, is configured to determine data of the data signal 245 embedded in the luminance output 205 of the illumination system 200. As shown, the optical receiver 700 includes an optical detector 710, a processing unit 720, and, optionally, a memory 740.

Depending on how many light sources are included within the illumination system 200 and whether those light sources operate synchronously or asynchronously, different methods for retrieving data from the luminance output 205 may be implemented in the optical receiver 700.

For all of the methods implemented in the optical receiver 700, the processing unit 720 has access to the base code, the synchronization code, and the information about how often the synchronization code occurs in the information signals. In one embodiment, the illumination system 200 may directly provide this information to the processing unit 720, either before the system controller 210 starts or after the system controller 210 stops phase shifting the base code to embed data. In another embodiment, the optical receiver 700 may include the memory 740 storing this information. In yet another embodiment, the optical receiver 700 may be configured to obtain this information from the (wirelessly) received light signals. For example, one or more of the light sources of the illumination system 200 may be configured to generate their respective luminance outputs in dependence of the modulated drive signals generated based on the information signals comprising non-shifted base codes for the duration of a training time period. During the training time period, the optical receiver 700 may obtain the base code, the synchronization code, and/or the frequency of the occurrence of the synchronization code from the detected luminance output 205 because in that time period the system controller 210 does not phase shift the base code. Such training period may occur, for example, in a regular pattern (e.g. once a second) or when a new receiver is detected in the system. The base code, the synchronization code, and/or the frequency of the occurrence of the synchronization code obtained from the received light signals may be stored in the memory 740 for later use. Alternatively, the processing unit 720 may obtain, by any of the means described above, not the base code, the synchronization code, and/or the frequency of the occurrence of the synchronization code themselves, but derivatives thereof (i.e., parameters from which this information may be obtained). For example, the processing unit 720 may obtain the length of Barker's sequence or the m-sequence or an indicator number referring to one out of the set of possible base codes. The base code and/or the synchronization code may then be recreated by the processing unit 720, potentially reducing the amount of communication provided to the optical receiver 700. In another embodiment, the parameters describing the base code and/or the synchronization code may be extracted from the received light signals.

While the method steps for retrieving the data are described in conjunction with FIG. 7, persons skilled in the art will recognize that any system configured to perform the method steps, in any order, is within the scope of the present invention.

A first method that may be implemented in the optical receiver 700 includes method steps for retrieving data from the luminance output 205 when the illumination system 200 includes a single light source. The method begins in step 1-1, where the optical detector 710 detects the luminance output 205 via a photo sensitive detector, such as e.g. a photo detector, a colour sensor, a photo detector array, or a camera. In this embodiment, the luminance output 205 includes the luminance output of the single light source in the illumination system 200. In step 1-2, the processing unit 720 retrieves the information signal based on the detected luminance output. This may be accomplished e.g. by converting the received optical signal (the detected luminance output 205) into an electrical signal which is conditioned (amplified and filtered), digitized, and demodulated from the drive signal to arrive at the information signal. Such receiver operations are known to people skilled in the art.

In step 1-3, the processing unit 720 correlates the information signal with the synchronization code. As a result of this correlation, a first correlation output having at least one peak is generated. As previously described, a correlation output typically includes a number of "peaks," some are smaller than the others and represent artifacts of the correlation process. Such small peaks are referred to herein as "subpeaks" and the term "peak" is used herein to describe peaks in a correlation output that indicate beginnings of the relevant parts of the information code (such as the beginning of the synchronization code or the beginning of the base code). These peaks are clearly higher than the subpeaks in the correlation output and a person skilled in the art could easily identify them.

The at least one peak within the first correlation output corresponds to the beginning of the synchronization code within the information signal. If the information signal generated by the system controller 210 comprises an alternating sequence of a synchronization code and a base code, then the first correlation output would have several peaks corresponding to each instance of the synchronization code within the information signal.

The location of the peak within the first correlation output provides the processing unit 720 with a synchronization necessary for successful determination of the phase shift applied to the base code to embed data. Since the processing unit 720 has an access to the base code, the synchronization code, and the frequency of the occurrence of the synchronization code in the information signal, once the processing unit 720 identified the beginning of the synchronization code, the processing unit 720 can identify whether the base code following or preceding the synchronization code has been shifted and by how much. Thus, in step 1-4, based on the location of the peak within the first correlation output, the processing unit 720 cyclically correlates the information signal with the base code to generate a second correlation output having one peak. This peak corresponds to the beginning of the base code within the information signal. The location of this peak within the second correlation output is determined by the phase shift applied by the system controller 210 to the base code to produce a shifted base code present in the information signal. For example, if the system controller 210 generated the shifted base code by phase shifting the base code by 5 units, then the second correlation output would include a peak at a location corresponding to 5 units.

In step 1-5, based on the location of the peak within the second correlation output, the processing unit 720 determines the phase shift applied by the system controller 210 to the base code to generate the shifted base code. The method ends in step 1-6, where, based on the determined phase shift, the processing unit 720 determines the data embedded in the shifted base code.

A second method that may be implemented in the optical receiver 700 includes method steps for retrieving data from the luminance output 205 when the illumination system 200 includes two synchronous light sources. The method begins in step 2-1, where the optical detector 710 detects the luminance output 205. Again, the luminance output 205 may be detected via a photo sensitive detector, such as e.g. a photo detector, a color sensor, a photo detector array, or a camera. In this embodiment, the luminance output 205 is the sum of the luminance outputs of the two light sources in the illumination system 200. In step 2-2, the processing unit 720 retrieves the total information signal based on the detected luminance output. This may be accomplished as described in the first method. The total information signal is the sum of an information signal corresponding to one light source and an information signal corresponding to the other light source.

In step 2-3, the processing unit 720 correlates the total information signal with the synchronization code. As a result of this correlation, a correlation output having at least one peak is generated. Since the two light sources operate synchronously, their synchronization codes overlap in time and the peak corresponds to sum of the synchronization code within the first information signal and the synchronization code within the second information signal that begins at the same time with the synchronization code of the first information signal. Again, if each of the first and second information signals generated by the system controller 210 comprises an alternating sequence of a synchronization code and a base code, as described above, then the first correlation output would have several peaks corresponding to each instance of the overlapping synchronization code within the total information signal.

Similarly to step 1-4 described above, in step 2-4, based on the location of the peak within the first correlation output, the processing unit 720 cyclically correlates the total information signal with the base code to generate a second correlation output. In this case, the second correlation output has two peaks. The peaks correspond to the two different base codes within the total information signal (one from each of the first and second information signals). The locations of the two peaks are determined by the phase shifts applied by the system controller 210 to the base code to generate the information signals for the two light sources. Thus, the location of one of the two peaks within the second correlation output is determined by a first phase shift applied by the system controller 210 to the base code to produce a first shifted base code present in the total information signal and the location of the other peak is determined by a second phase shift applied by the system controller 210 to the base code to produce a second shifted base code present in the total information signal. For example, if the system controller 210 generated the first shifted base code by phase shifting the base code by 5 units and generated the second shifted base code by phase shifting the base code by 2 units, then the second correlation output would include peaks at locations corresponding to 5 units and 2 units.

In step 2-5, based on the location of one of the two peaks within the second correlation output, the processing unit 720 determines the phase shift applied by the system controller 210 to one of the base codes to generate a shifted base code (e.g., a first phase shift). In step 2-6, based on the determined first phase shift, the processing unit 720 determines the data embedded in the first shifted base code.

In step 2-7, based on the location of the other one of the two peaks within the second correlation output, the processing unit 720 determines the phase shift applied by the system controller 210 to the other base code to generate a shifted base code (e.g., a second phase shift). The method ends in step 2-8, where, based on the determined second phase shift, the processing unit 720 determines the data embedded in the second shifted base code.

A third method that may be implemented in the optical receiver 700 includes method steps for retrieving data from the luminance output 205 when the illumination system 200 includes two asynchronous light sources. The method begins in step 3-1, where the optical detector 710 detects the luminance output 205. Again, the luminance output 205 may be detected via a photo sensitive detector, such as e.g. a photo detector, a color sensor, a photo detector array, or a camera. In this embodiment, the luminance output 205 is the sum of the luminance outputs of the two light sources in the illumination system 200. In step 3-2, the processing unit 720 retrieves the total information signal based on the detected luminance output. This may be accomplished as described in the first method. The total information signal is the sum of an information signal corresponding to one light source and an information signal corresponding to the other light source.

In step 3-3, the processing unit 720 correlates the total information signal with the synchronization code. As a result of this correlation, a first correlation output having at least two peaks is generated. Since the two light sources operate asynchronously, their synchronization codes do not overlap in time and, therefore, one of the peaks corresponds to the beginning of the synchronization code within the first information signal while the other peak corresponds to the beginning of the synchronization code within the second information signal. Again, if each of the first and second information signals generated by the system controller 210 comprises an alternating sequence of a synchronization code and a base code, as described above, then the first correlation output would have several peaks corresponding to each instance of the synchronization code within the total information signal.

In step 3-4, based on the location of the highest peak within the first correlation output, the processing unit 720 cyclically correlates the total information signal with the base code to generate a second correlation output having one peak. The highest peak within the first correlation output corresponds to the beginning of the synchronization code of the strongest light source of the two light sources included in the illumination system 200. Assuming that the first light source is the strongest light source, the highest peak within the second correlation output corresponds to the base code within the first information signal corresponding to the first light source. Again, the location of this peak is determined by a first phase shift applied by the system controller 210 to the base code to generate a first information signal. For example, if the system controller 210 generated a first shifted base code of the first information signal by phase shifting the base code by 5 units, then the second correlation output would include a peak at a location corresponding to 5 units.

In step 3-5, based on the location of the peak within the second correlation output, the processing unit 720 determines the first phase shift applied by the system controller 210 to the base codes to generate the first shifted base code. In step 3-6, based on the determined first phase shift, the processing unit 720 determines the data embedded in the first shifted base code.

After step 3-6, the processing unit 720 may, optionally, based on a correlation value of the highest peak of the at least two peaks within the first correlation output and/or on a correlation value of the peak within the second correlation output, determine an amplitude of the first information signal. Then, based on the location of the highest peak of the at least two peaks within the first correlation output, the location of the peak within the second correlation output, and the determined amplitude of the first information signal, the processing unit 720 may recreate the first information signal. The processing unit 720 may further subtract the recreated first information signal from the total information signal to obtain a new information signal. At that point, the processing unit 720 may repeat steps 3-3 through 3-6 using the new information signal in place of the total information signal to determine data embedded in the second shifted base code.

When data embedded in the luminance output of the light sources comprises identifiers of the light sources, the processing unit 720 may further use the correlation values of peaks within the first or second correlation outputs to estimate illumination contributions of different identified light sources.

For all three methods described above, the processing unit 720 may also determine the signs of shifted base codes in order to determine additional data embedded in the luminance output of the illumination system.

One advantage of the present invention is that the data may be embedded in a luminance output of an illumination system in a manner that allows fully asynchronous operation of the individual light sources in the illumination system.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

While the forgoing is directed to embodiments of the present invention, other and further embodiments of the invention may be devised without departing from the basic scope thereof. For example, aspects of the present invention may be implemented in hardware or software or in a combination of hardware and software. Therefore, the scope of the present invention is determined by the claims that follow.

The invention claimed is:

1. An illumination system for embedding data into a luminance output of the illumination system, the system comprising:
 a first controller configured for:
  generating a first shifted base code by circularly shifting a base code within a base code period with a first phase shift to embed first data into the first shifted base code, wherein the first phase shift corresponds to the first data,
  generating a first information signal comprising the first shifted base code and a synchronization code, and
  generating a first modulated drive signal by modulating one or more of first drive patterns of a first drive signal in dependence of the first information signal such that the first data is embedded in the luminance output of the illumination system; and
 a first light source configured for generating a first luminance output in dependence of the first modulated drive signal,
 wherein the luminance output of the illumination system comprises the first luminance output.

2. The illumination system of claim 1, wherein the first data comprises an identification of the first light source.

3. The illumination system according to claim 1, wherein the first controller is further configured for generating the first shifted base code by setting a sign of the first shifted base code within the base code period.

4. The illumination system according to claim 1, wherein the synchronization code comprises a first sequence of two or more binary values, the first sequence being detectable using correlation, the base code comprises a second sequence of two or more binary values, the second sequence being detectable using a cyclic correlation, and/or wherein a cross-correlation between the synchronization code and the base code is low.

5. The illumination system according to claim 1, wherein the first controller is further configured for generating the first shifted base code by setting a first sign of the first shifted base code within the base code period and generating a second shifted base code by circularly shifting the base code within the base code period with the first phase shift and setting a second sign of the second shifted base code to embed additional data into the first and second shifted base codes, wherein the first information signal further comprises the second shifted base code.

6. The illumination system of claim 1, further comprising:
 a second controller configured for:
  generating a second shifted base code by circularly shifting the base code within the base code period with a second phase shift to embed second data into the second shifted base code, wherein the second phase shift corresponds to the second data,
  generating a second information signal comprising the second shifted base code and the synchronization code, and
  generating a second modulated drive signal by modulating one or more of second drive patterns of a second drive signal in dependence of the second information signal such that the second data is embedded in the luminance output of the illumination system; and
 a second light source configured for generating a second luminance output in dependence of the second modulated drive signal,
 wherein the luminance output of the illumination system further comprises the second luminance output.

7. An optical receiver configured for use with the illumination system according to claim 1, the receiver comprising:
 an optical detector configured for detecting the first luminance output; and
 a processing unit having access to the base code and the synchronization code and configured for:
  retrieving the first information signal based on the detected first luminance output,
  correlating the first information signal with the synchronization code to generate a first correlation output having at least one peak,
  based on the location of the at least one peak within the first correlation output, cyclically correlating the first information signal with the base code to generate a second correlation output having one peak,
  based on the location of the one peak within the second correlation output, determining the first phase shift, based on the determined first phase shift, determining the first data.

8. An optical receiver configured for use with the illumination system according to claim 6 wherein the synchronization code of the first information signal and the synchronization code of the second information signal begin at the same time, the receiver comprising:
an optical detector configured for detecting the luminance output; and
a processing unit having access to the base code and the synchronization code and configured for:
retrieving a total information signal based on the detected luminance output, wherein the total information signal comprises the sum of the first information signal and the second information signal,
correlating the total information signal with the synchronization code to generate a first correlation output having at least one peak,
based on the location of the at least one peak within the first correlation output, cyclically correlating the total information signal with the base code to generate a second correlation output having two peaks,
based on the location of one of the two peaks within the second correlation output, determining the first phase shift,
based on the location of the other one of the two peaks within the second correlation output, determining the second phase shift,
based on the determined first phase shift, determining the first data, and
based on the determined second phase shift, determining the second data.

9. An optical receiver configured for use with the illumination system according to claim 6, the receiver comprising:
an optical detector configured for detecting the luminance output; and
a processing unit having access to the base code and the synchronization code and configured for:
retrieving a total information signal based on the detected luminance output, wherein the total information signal comprises the sum of the first information signal and the second information signal,
correlating the total information signal with the synchronization code to generate a first correlation output having at least two peaks,
based on the location of the highest peak of the at least two peaks within the first correlation output, cyclically correlating the total information signal with the base code to generate a second correlation output having one peak,
based on the location of the one peak within the second correlation output, determining the first phase shift,
based on the determined first phase shift, determining the first data.

10. The optical receiver according to claim 9, wherein the processing unit is further configured for:
based on at least one of a correlation value of the highest peak of the at least two peaks within the first correlation output and a correlation value of the one peak within the second correlation output, determining an amplitude of the first information signal,
based on the location of the highest peak of the at least two peaks within the first correlation output, the location of the one peak within the second correlation output, and the determined amplitude of the first information signal, obtaining the first information signal,
subtracting the first information signal from the total information signal to obtain a new information signal,
correlating the new information signal with the synchronization code to generate a third correlation output having at least one peak,
based on the location of the highest peak of the at least one peak within the third correlation output, cyclically correlating the new information signal with the base code to generate a fourth correlation output having one peak,
based on the location of the one peak within the fourth correlation output, determining the second phase shift,
based on the determined second phase shift, determining the second data.

11. The optical receiver according to claim 7, wherein the processing unit is further configured for determining a sign of the first shifted base code.

12. An illumination structure comprising one or more illumination systems according to claim 1 and a remote control comprising at least one optical receiver, the one or more illumination systems being configured for being controlled using the remote control.

13. A method for embedding data into a luminance output of the illumination system, the method comprising:
generating a first shifted base code by circularly shifting a base code within a base code period with a first phase shift to embed first data into the first shifted base code, wherein the first phase shift corresponds to the first data;
generating a first information signal comprising the first shifted base code and a synchronization code;
generating a first modulated drive signal by modulating one or more of first drive patterns of a first drive signal in dependence of the first information signal such that the first data is embedded in the luminance output of the illumination system;
generating a first luminance output in dependence of the first modulated drive signal,
wherein the luminance output of the illumination system comprises the first luminance output.

14. A computer program comprising software code portions configured for, when executed in an optical receiver according to claim 8, performing the steps comprising:
retrieving a total information signal based on the detected luminance output, wherein the total information signal comprises the sum of the first information signal and the second information signal,
correlating the total information signal with the synchronization code to generate a first correlation output having at least one peak,
based on the location of the at least one peak within the first correlation output, cyclically correlating the total information signal with the base code to generate a second correlation output having two peaks,
based on the location of one of the two peaks within the second correlation output, determining the first phase shift,
based on the location of the other one of the two peaks within the second correlation output, determining the second phase shift,
based on the determined first phase shift, determining the first data, and
based on the determined second phase shift, determining the second data.

15. A computer program comprising software code portions configured for, when executed in an optical receiver according to claim 9, performing the steps comprising:

retrieving a total information signal based on the detected luminance output, wherein the total information signal comprises the sum of the first information signal and the second information signal, correlating the total information signal with the synchronization code to generate a first correlation output having at least two peaks, based on the location of the highest peak of the at least two peaks within the first correlation output, cyclically correlating the total information signal with the base code to generate a second correlation output having one peak, based on the location of the one peak within the second correlation output, determining the first phase shift, based on the determined first phase shift, determining the first data.

* * * * *